(12) United States Patent
Herdin

(10) Patent No.: US 6,425,689 B1
(45) Date of Patent: Jul. 30, 2002

(54) BEARING ARRANGEMENT FOR SUPPORTING A MOVABLE COMPONENT, IN PARTICULAR THE CRANKSHAFT OF AN INTERNAL COMBUSTION ENGINE

(75) Inventor: Gunther Herdin, Jenbach (AT)

(73) Assignee: Jenbacher Aktiengesellschaft, Jenbach (AT)

( * ) Notice: Subject to any disclaimer, the term of this patent is extended or adjusted under 35 U.S.C. 154(b) by 0 days.

(21) Appl. No.: 09/637,284

(22) Filed: Aug. 11, 2000

(30) Foreign Application Priority Data

Aug. 13, 1999 (AT) .............................................. 1389/99

(51) Int. Cl.⁷ .............................................. F16C 33/66
(52) U.S. Cl. .................. 384/322; 384/399; 123/196 A; 184/6.24
(58) Field of Search ..................... 184/6.24; 123/196 A; 384/322, 368, 372, 397, 398, 399, 400, 462, 469, 473

(56) References Cited

U.S. PATENT DOCUMENTS

| | | | |
|---|---|---|---|
| 3,893,737 A | * | 7/1975 | Tyson .......................... 384/307 |
| 3,911,659 A | * | 10/1975 | Mandl .......................... 384/222 |
| 4,152,031 A | * | 5/1979 | Maguire ................ 184/6.24 X |
| 4,183,591 A | | 1/1980 | Mayer |
| 4,696,584 A | | 9/1987 | Tielemans ................... 384/107 |
| 4,772,136 A | | 9/1988 | Carter .......................... 384/112 |
| 4,793,424 A | | 12/1988 | Lim, Jr. |
| 4,925,321 A | | 5/1990 | Maruyama et al. ......... 384/114 |
| 5,382,099 A | * | 1/1995 | Bauer et al. ............ 384/465 X |
| 5,785,390 A | | 7/1998 | Gold et al. |
| 6,035,817 A | * | 3/2000 | Uchida ................... 123/196 A |

FOREIGN PATENT DOCUMENTS

| | | |
|---|---|---|
| DE | 722 361 C | 7/1942 |
| DE | 37 03 964 A | 8/1988 |
| EP | 0 304 109 A2 | 2/1989 |
| EP | 0 600 559 A | 6/1994 |
| GB | 1039942 | 8/1966 |
| JP | 08338425 A | 12/1996 |
| JP | 10184670 A | 7/1998 |

OTHER PUBLICATIONS

European Search Report (Date of Completion: Sep. 29, 2000)–1 page.

* cited by examiner

Primary Examiner—Thomas R. Hannon
(74) Attorney, Agent, or Firm—Lorusso & Loud

(57) ABSTRACT

A bearing arrangement for supporting a movable component, in particular the crankshaft, of an internal combustion engine, having at least one bearing for receiving the component and an oil feed line to each bearing, wherein a filter (5) is arranged in the oil feed line (7) directly upstream of the bearing (3).

11 Claims, 2 Drawing Sheets

Figure 1:
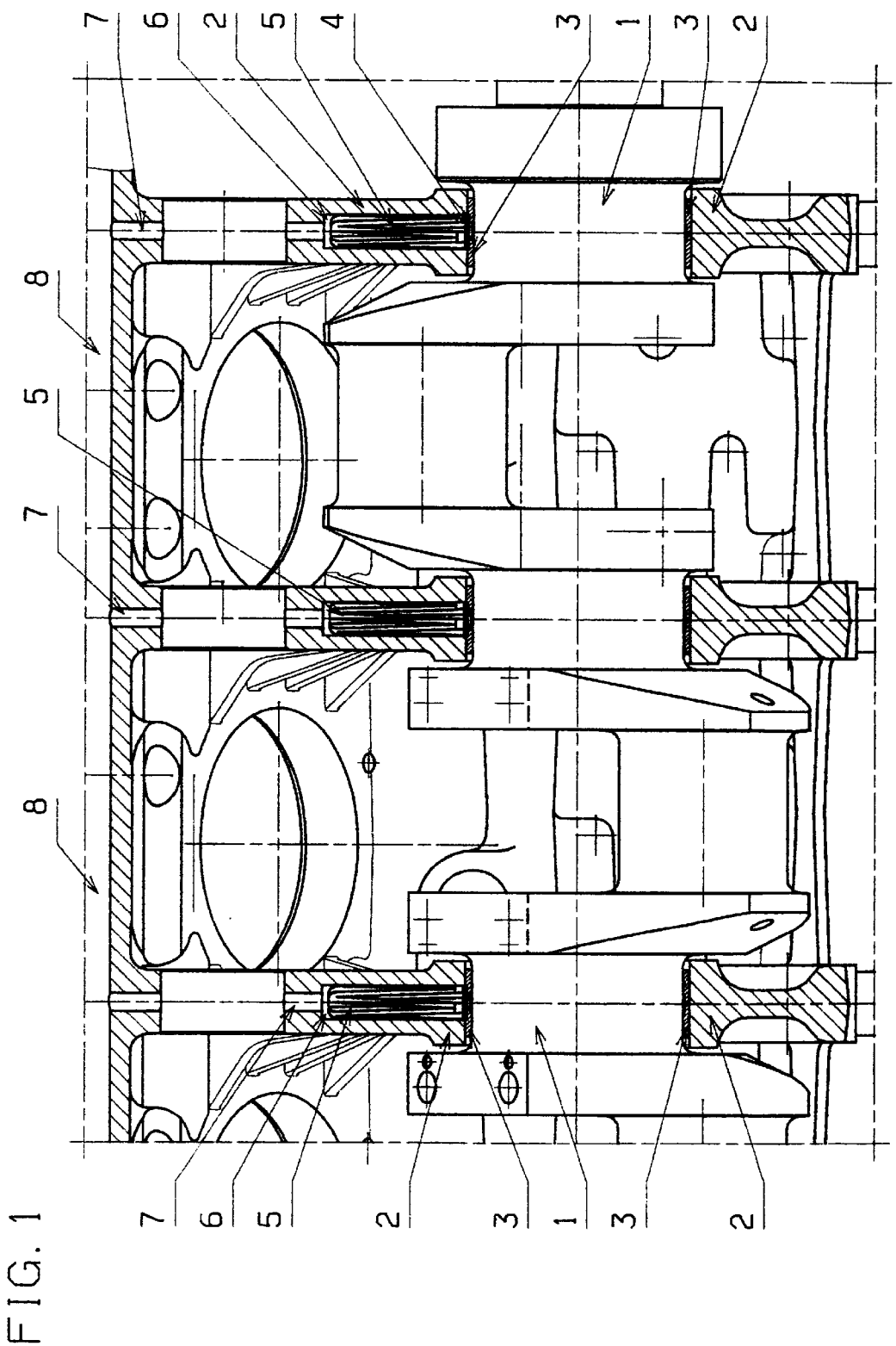

BEARING ARRANGEMENT FOR SUPPORTING A MOVABLE COMPONENT, IN PARTICULAR THE CRANKSHAFT OF AN INTERNAL COMBUSTION ENGINE

The invention concerns a bearing arrangement for supporting a movable component, in particular the crankshaft of an internal combustion engine, having at least one bearing for receiving the component and an oil feed line to each bearing.

It is already conventional and has long been known to install filters in the oil circuit of internal combustion engines in order to keep contamination and impurities away from the bearings. Those filters are usually provided at a central location in the oil circuit and cannot entirely reliably prevent contamination and impurities reaching the bearing locations, in particular the original dirt which generally cannot be entirely avoided upon assembly. Hitherto therefore the practice has been to use bearing materials which were soft in a certain sense and which thus entailed an embedding capability for impurities in the oil so that the proper operability of the bearing was not seriously adversely affected.

The object of the invention is to provide an improved bearing arrangement in which even bearing materials which have a particularly sensitive reaction to impurities are used.

In accordance with the invention that is achieved in that a filter is arranged in the oil feed line directly upstream of the bearing. An engine generally has a plurality of bearings, for example crankshaft bearings. In accordance with a preferred embodiment of the invention the filter is not arranged in a common main oil line but a respective specific filter element is arranged just upstream of the respective bearing in the respective oil feed line thereto, which branches from the main oil line and leads to the respective bearing. Advantageously, the distance of the filter from the bearing is in the centimeter range and below. If the structure configuration allows it, it is desirable if the outlet of the filter is less than 5 mm from the bearing, that is to say it is disposed practically directly at the bearing. That means that the section in which potential impurities can occur is vanishingly short and any particles which may occur, in particular the original dirt which occurs upon assembly of the engine, are reliably kept away from the bearing location.

The invention is particularly suitable for plain bearings which have a hard coating which is applied galvanically or by sputtering and which is of a small thickness (preferably less than 50 $\mu$m). Plain bearings of that kind are inexpensive to produce but hitherto they were not used because of their sensitivity to dirt. The filter arrangement according to the invention now makes it possible to resolve the contamination problem and it is also possible reliably to use directly coated plain bearings with a thin hard layer. The fineness of the filter can be adapted to the respective conditions involved, for example it is desirable to use filters which retain particles which are larger than 0.1 mm.

From the structural point of view, such a filter can be in the form of a so-called gap filter or edge filter in which the oil is passed through at least one gap defining the maximum particle size which is allowed to pass therethrough. In particular, such a gap filter may have an insert body which has V-shaped recesses. The entire insert body is then fitted into a receiving bore which is slightly larger in diameter than the insert body itself. The oil can then flow into a V-shaped recess and can flow by way of the gap between the outside surface of the insert body and the inside surface of the receiving bore into an adjacent V-shaped recess which is open towards the bearing. The V-shape provides that the flow speed by way of the gap is substantially the same at all locations. Gap filters of that kind are already structurally known per se, but hitherto they were only used upstream of injection nozzles in order to retain impurities from the fuel.

Further advantages and details of the invention are described with reference to the specific description hereinafter.

Figure 2:
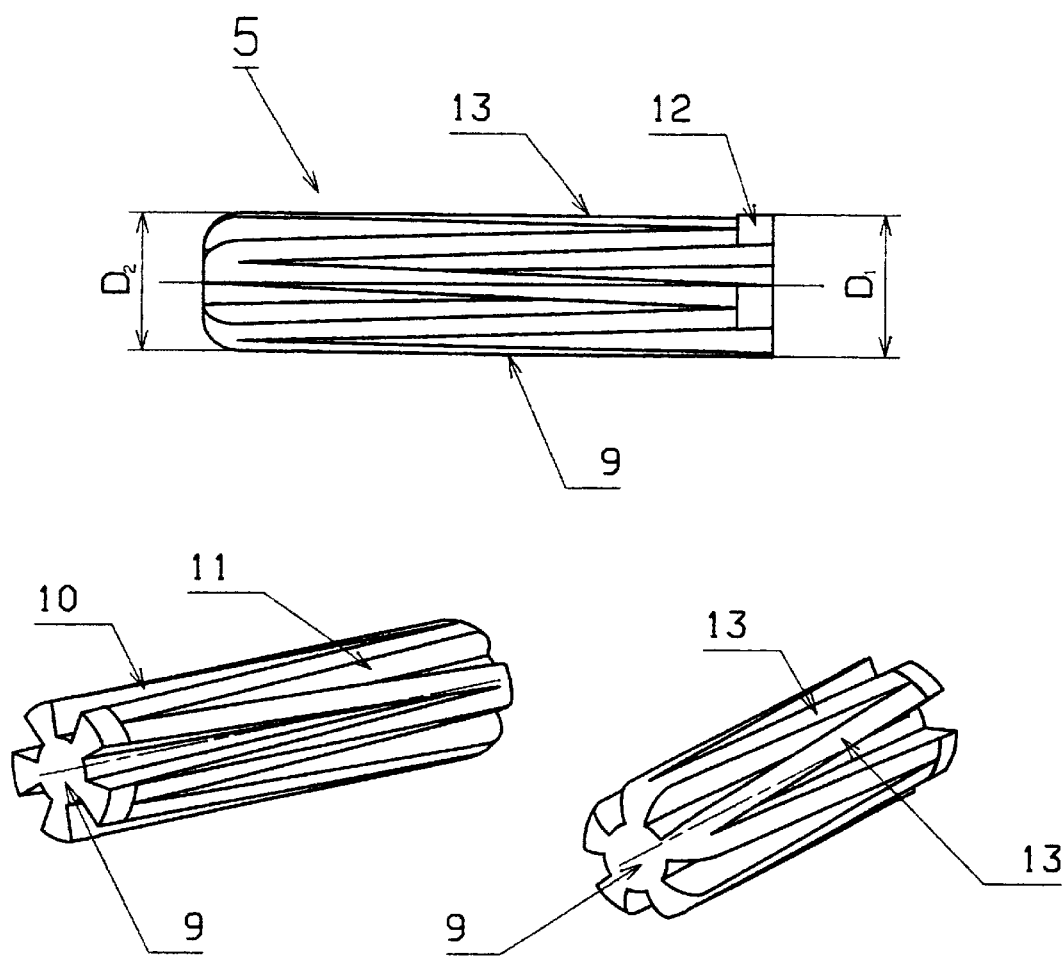

FIG. 1 is a diagrammatic view in section through a part of an internal combustion engine in the region of the crankshaft, showing three crankshaft bearings, and FIG. 2 shows various views of the insert body of a gap filter.

FIG. 1 shows a crankshaft 1 which is supported rotatably in bearing shells 2. The actual bearing material used is a thin hard coating layer 3 which is shown on an enlarged scale in the drawing and which is applied for example galvanically or by sputtering. The layer has an oil distribution groove 4 in the upper bearing half shell.

Now, in accordance with the invention disposed upstream of each bearing 3 is a filter element 5 whose spacing from the bearing 3 is only in the centimeter range and below and desirably entirely vanishes so that the section between the filter 5 and the bearing 3 is as small as possible. The gap or edge filter 5 which will be described in greater detail with reference to FIG. 2 is fitted into an enlarged receiving bore 6 in the straight oil feed line 7. The individual oil feed lines 7 branch from a common oil line 8 and lead from there to the individual bearings. There is therefore no central oil filter, but each of the individual bearings has disposed directly upstream thereof its own respective filter 5.

FIG. 2 shows various views of the insert body 9 of the gap filter. The insert body 9 has mutually oppositely disposed V-shaped recesses 10 and 11 which in the installed condition are open alternately to the main oil line 8 and the bearing 3 respectively. The insert body 9 has a centering collar 12 which is slightly enlarged in diameter and which bears snugly against the inside surface of the receiving bore 6. The rest of the outside surface 13 is of a diameter D2 which is reduced in comparison with the diameter D1 of the centering collar 12, whereby it is spaced at a certain gap dimension from the inside surface of the receiving bore 6. The difference between D1 and D2 therefore determines the width of the gap and accordingly the maximum particle size which is allowed to pass through the filter. The oil flows in by way of the recesses 11 which are open in a V-shape to the main oil line and then flows between the outside surface of the insert body 9 and the inside surface of the receiving bore 6 across the lands 13 of the outside surface into the adjacent V-shaped recesses 10 which are open to the bearing 3.

This structure can ensure that contamination and impurities, in particular the original dirt and possible larger particles which occur later are reliably kept away from the sensitive bearings 3. It is therefore possible to also use more expensive plain bearings hating a thin hard coating which is applied for example galvanically or by sputtering. In principle the filter arrangement according to the invention is however also suitable in relation to other types of bearings, in which respect it is also possible to use other suitable filters than gap filters.

What is claimed is:

1. A bearing arrangement for supporting a movable component of an internal combustion engine, comprising:

at least one plain bearing for receiving the component, having a coating which is applied galvanically or by sputtering and which is harder than the subjacent support material of the bearing;

an oil feed line to each bearing; and a filter being arranged in the oil feed line directly upstream of the bearing and almost extending to the bearing.

2. A bearing arrangement as set forth in claim 1, wherein the outlet of the filter is arranged at a spacing less than 5 mm from the bearing.

3. A bearing arrangement as set forth in claim 1, wherein the filter is arranged in a receiving bore, which is arranged in a straight oil feed bore and extends to the bearing.

4. A bearing arrangement as set forth in claim 3, wherein the receiving bore is larger in diameter than the oil feed bore.

5. A bearing arrangement as set forth in claim 1 comprising two or more bearings, to each of which leads a respective oil feed line from a common main oil line, wherein a filter is arranged in each oil feed line between the branch from the main oil line and the bearing.

6. A bearing arrangement as set forth in claim 1, wherein the thickness of the coating is less than 50 $\mu$m.

7. A bearing arrangement as set forth in claim 6, wherein the thickness of the coating is less than 20 $\mu$m.

8. A bearing arrangement as set forth in claim 1, wherein the filter retains particles which are larger than 0.1 mm.

9. A bearing arrangement as set forth in claim 1, wherein the filter is a gap filter in which the oil is passed through at least one gap defining the maximum particle size which is to be allowed to pass.

10. A bearing arrangement as set forth in claim 9, wherein the gap filter has an insert body which is provided with V-shaped recesses and which is fitted into a receiving bore, wherein the gap is defined between the outside surface of the insert body and the inside surface of the receiving bore.

11. A bearing arrangement as set forth in claim 1, wherein the movable component is a crankshaft of an internal combustion engine.

* * * * *